June 5, 1945.  J. R. TEAGNO  2,377,826
TURBO TRANSMISSION
Filed May 28, 1941
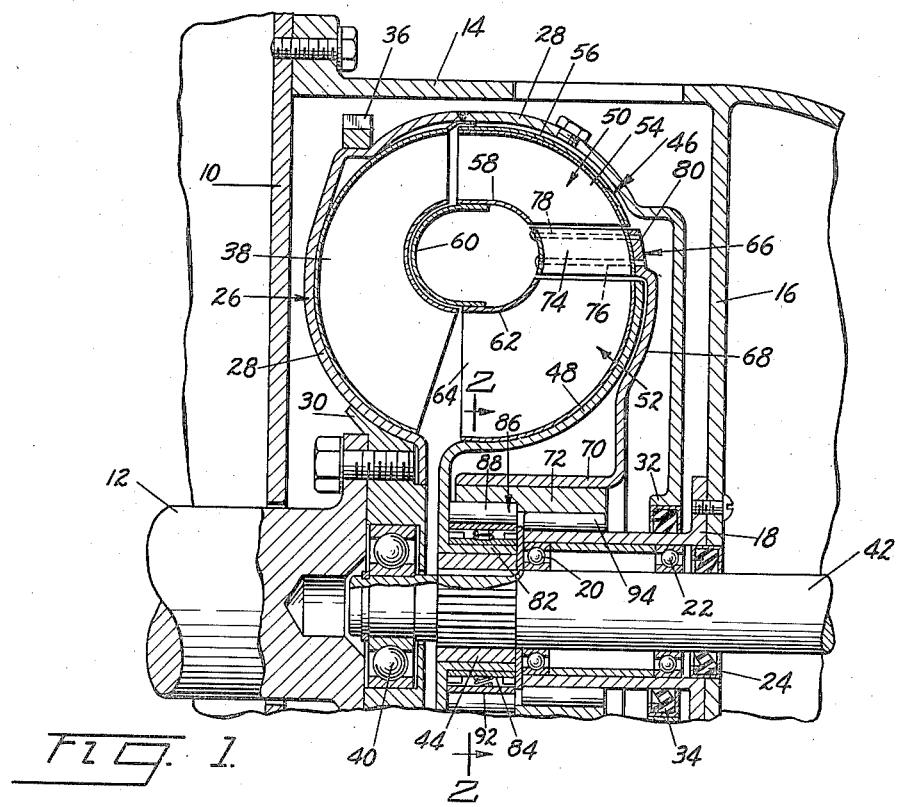
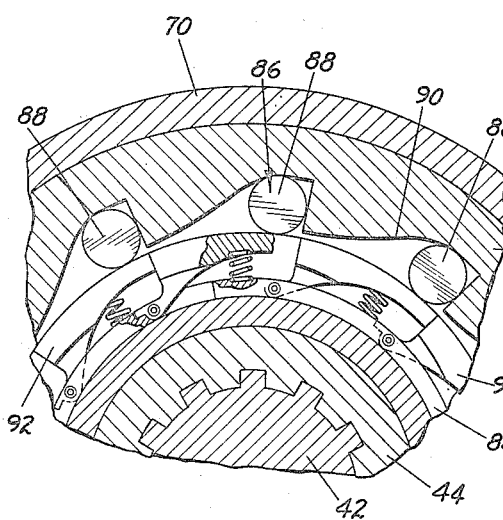
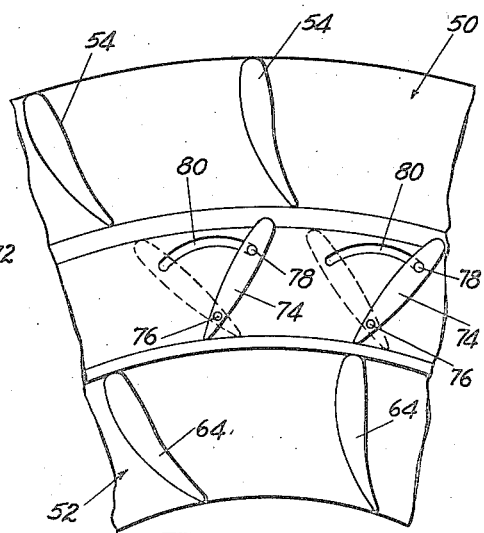
INVENTOR.
JOSEPH R. TEAGNO
BY
O. H. Fowler
ATTORNEY Patented June 5, 1945

2,377,826

UNITED STATES PATENT OFFICE 2,377,826

TURBOTRANSMISSION

Joseph R. Teagno, Detroit, Mich.

Application May 28, 1941, Serial No. 395,665

6 Claims. (Cl. 60—54)

This invention relates to fluid transmissions and more particularly to the reaction member thereof.

Broadly the invention comprehends a fluid transmission including an impeller, a turbine, a reaction member associated with the turbine operative automatically due to the directional characteristics of flow of the fluid from the turbine to provide for operation of the unit as a torque converter or fluid clutch and means for aligning the vanes of the reaction member and turbine when the unit operates as a fluid clutch.

Another object of the invention is the provision of a fluid transmission including a reaction member having automatically adjustable fluid direction reactive vanes, so adjustable as to pitch whereby the reverse speed of the reaction member is increased.

A further object of the invention is to provide a fluid transmission including a turbine and a reaction member, means resisting rotation of the reaction member in one direction, and means positively coupling and aligning the reaction member and turbine for rotation together.

A still further object of the invention is the provision of a fluid transmission including a turbine and reaction member, means resisting rotation of the reaction member in one direction, means on the reaction member permitting an over-running of the turbine in the direction of rotation of the turbine, and means between the reaction member and turbine for coupling the reaction member to the turbine and for aligning the vanes of the member and the turbine.

And yet another object of the invention is to provide a fluid transmission including turbine vanes, automatically adjustable fluid direction reactive vanes, means resisting rotation of the fluid direction reactive vanes in one direction, means providing for pivotal action of the reactive vanes due to the direction of fluid flow to thus assume a lesser angle of pitch than the turbine vanes, and means coupling the reactive vanes and turbine vanes in aligned position.

Other objects and advantages will appear from the following description taken in connection with the drawing and in which—

Fig. 1 is a sectional view of a torque converter embodying the invention;

Fig. 2 is a sectional view substantially on line 2—2 of Fig. 1; and

Fig. 3 is an enlarged view illustrating the relation between the reaction member and the two stages of the turbine.

Referring to the drawing for more specific details of the invention, 10 represents the crank case of an internal combustion engine, and 12 the crank shaft of the engine. The crank case has secured thereto a bell housing 14 provided with an internal web 16. A ring 18 mounted on one side of the web 16 supports bearings 20 and 22 and a fluid seal 24, the bearings and fluid seal being in axial alignment with the crank shaft 12.

A torque converter indicated generally at 26, includes a housing 28 having a hub 30 bolted or otherwise secured to the crank shaft 12, and an oppositely disposed hub 32 supporting a fluid seal 34. The housing has thereon a ring gear 36 for connecting a starter, not shown, and a plurality of impeller blades 38 are suitably mounted on the inner wall of the housing 28. Fitted in the hub 30 is a bearing 40 in axial alignment with the crank shaft 12.

A driven shaft 42 supported for rotation on the bearings 20, 22 and 40 in axial alignment with the crank shaft 12 has splined thereon a heavy sleeve 44. A turbine indicated generally at 46 rotatable in the housing 28 includes a web 48 supported on and fixedly secured to the sleeve 44 for rotation therewith, and the web 48 supports a two-stage turbine 50 and 52.

As shown, the first stage of the turbine consists of a plurality of vanes 54, suitably secured to an outer shroud 56 and to an inner shroud 58. The inner shroud 58 is fixedly secured to an inner shroud section 60 adjacent the impeller blades 38, and the shroud section 60 is fixedly secured to another inner shroud section 62 secured to a plurality of vanes 64 mounted on the web 48. The vanes 64 constitute the second stage of the turbine.

Interposed between the first and second stages of the turbine is a reaction member 66 carried by a web 68. An axially extended flange 70 of the reaction member is fixedly secured to a heavy sleeve 72 and adapted to be supported by means to be hereinafter disclosed. Mounted on the web 68 is a plurality of automatically adjustable reaction vanes 74 of like number as the vanes 54 of the turbine. The vanes 74 are freely pivotal on pins 76 to permit movement of pins 78 on the vanes to follow an arcuate slot 80 in the web of the member. The position of the vanes is determined by the directional forces of the fluid exiting from the first stage of the turbine.

The position as outlined in Fig. 3 is substantially the desired position when the turbo transmission operates as a torque converter and the position of the blade in its other extreme as indicated by dotted line is when the unit operates as a fluid clutch. An important feature of the invention resides in the position the vanes 74 assume when the unit operates as a fluid clutch, wherein the discharge angle is greater and the complementary pitch angle of the vanes 74 is less than that of the vanes of either stage of the turbine whereby the reaction member may be rotated at a higher rate of speed than the turbine.

Fixedly secured on the periphery of an axially extended flange 82 on the web 48 of the turbine is a ring member 84 and interposed between this ring and the sleeve 72 of the reaction member is a one way clutch 86. This one way driving means is conventional in part but further embodies a means for positively positioning the reaction member with relation to the turbine.

The one way clutch 86 includes rollers 88 fitted in inclined slots 90 in sleeve 72 to normally permit relative movement of the sleeve 72 and ring 84. Spring-tensioned segments 92 arranged end to end and each pivotal on ring 84 normally define the bearing race for the rollers 88. Whenever the sleeve 72 overruns the ring member 84 thereby producing a tendency for the rollers to lock between the inclined surface and the bearing race, a force is transmitted to the segments to thereby overcome the spring resistance and cause the segments to pivot, the end nearest the pivot becoming a stop element as the roller proceeds down the end of the adjacent segment face and impinges on the segment whereby the sleeve of the reaction member is positioned with relation to the ring of the turbine.

A one way brake 94 of conventional construction is interposed between the sleeve of the reaction member and the stationary ring 18 for resisting movement of the reaction member in a direction of rotation reverse to that of the turbine.

In a normal operation assuming that the unit is filled to its normal capacity with suitable fluid, transmission of force from the power plant or internal combustion engine through the crank shaft results in driving the impeller. The impeller energizes the fluid and the energy is received on the vanes 54 constituting the first stage of the turbine, the vanes 74 of the reaction member, and the vanes 64 of the second stage of the turbine causing rotation of the turbine. This rotation of the turbine results in driving the driven shaft 42.

As the speed of rotation of the impeller and turbine increases, the energy of the fluid increases proportionately, and this increased energy of the fluid acting on the vanes 54 of the turbine causes increase in speed of the turbine. As this increased speed of the turbine approaches that of the impeller, the fluid leaving the first stage of the turbine shifts from impinging on the faces of the vanes 74 of the reaction member to impinge on the backs of the vanes so as to pivot them about the pins 76 and cause rotation of the reaction member in the same direction as the turbine. The movement of the vanes to their extreme position provides for the function of the unit as a fluid clutch, and, accordingly, inasmuch as the speed of the reaction member surpasses that of the turbine due to the relative pitch angle of the reaction vanes and turbine vanes, the vanes on the reaction member become aligned to the vanes on the turbine through the one way clutch and aligning means 86 and thereafter rotate as a unit with the turbine during the time the transmission is functioning as a fluid coupling. It is to be observed from Fig. 2 that the clutch means provides for positive locking relationship of the turbine and reaction member whereby the vanes 54 will always assume alignment with vanes 74 during a fluid clutch operation of the transmission.

Upon decrease in speed of rotation of the impeller and the turbine, the energy of the fluid decreases proportionately. The fluid thus energized impinges on the reverse side of the vanes 74 of the reaction member causing the vanes to pivot to the position wherein the transmission unit operates as a torque converter. The reaction member is restricted from movement in a reverse direction to that of the turbine inasmuch as it becomes locked to the ring 18 mounted on the flange 16 of the bell housing 14 and remains locked thereto during the operation of the transmission as a torque converter.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. In a fluid transmission, an impeller, a turbine providing in conjunction therewith a fluid circuit, a reaction member cooperating with the impeller and turbine, an equal number of vanes on the turbine and reaction member, means resisting rotation of the reaction member in one direction, means on the reaction member movable under the influence of fluid directional flow in the circuit for controlling its rotation relative to the turbine and means actuated due to the reaction member overrunning the turbine to lock the reaction member and turbine together, said means providing for alignment of the turbine and reaction vanes when locked together.

2. In a fluid transmission an impeller, a turbine, a reaction member, an equal number of vanes on the turbine and reaction member, the vanes on the reaction member automatically adjustable due to fluid directional flow to thereby provide for overrunning of the turbine by the reaction member due to the resultant relative pitch angles of the vanes on the turbine and reaction member, and means coupling the reaction member and turbine so as to align the vanes thereof.

3. In a fluid transmission, an impeller, a turbine having equi-spaced vanes, a reaction member having equi-spaced automatically adjustable vanes equal in number to the vanes on the turbine, and means coupling the turbine and reaction members adapted to align the vanes of the members one to another upon the overrunning of the turbine by the reaction member, whereupon the vanes of the reaction member are in position for a fluid coupling operation of the transmission.

4. In a fluid transmission, an impeller, a turbine having vanes, a reaction member having automatically adjustable vanes equal in number to the vanes on the turbine, means resisting rotation of the reaction member in a direction reverse to that of the turbine, and means coupling the turbine and reaction members upon the overrunning of the turbine by the reaction member, whereupon the automatically adjustable reaction member vanes come into position for fluid coupling of the transmission and are aligned with the vanes of the turbine.

5. A fluid transmission comprising an impeller having blades, a turbine having equi-spaced vanes providing in conjunction therewith a fluid circuit, a reaction member in the circuit having an equal number of equi-spaced vanes as the turbine, said vanes being automatically adjustable due to fluid flow in the circuit, and means for locking the reaction member to the turbine upon the reaction member overrunning the turbine, said overrunning occurring when the reaction member rotates faster than the turbine due to the movement of the vanes on the reaction member to a lesser pitch angle than the turbine vanes, said means for locking the reaction member and turbine also providing for the alignment of the vanes of the turbine and the vanes of the reaction member.

6. A fluid transmission comprising an impeller, a turbine having equi-spaced vanes providing in conjunction therewith a fluid circuit, a reaction member movable in the circuit having an equal number of vanes as the turbine, said vanes being automatically adjustable as to pitch angle, a stationary member, means locking the reaction member to the stationary member during a torque converter operation of the transmission, and means for locking the reaction member to the turbine when the reaction member overruns the turbine, said overrunning occurring when the vanes on the reaction member move to a position whereby the pitch angle is less than that of the vanes on the turbine thus providing for faster rotation of the reaction member than the turbine, said locking means being adapted to positively align the vanes of the turbine and reaction member.

JOSEPH R. TEAGNO.